(12) United States Patent
Horng

(10) Patent No.: US 7,868,493 B2
(45) Date of Patent: Jan. 11, 2011

(54) MOTOR HAVING ROTATION BALANCING MEMBER

(75) Inventor: Alex Horng, Kaohsiung (TW)

(73) Assignee: Sunonwealth Electric Machine Industry Co., Ltd, Kaohsiung (TW)

( * ) Notice: Subject to any disclaimer, the term of this patent is extended or adjusted under 35 U.S.C. 154(b) by 71 days.

(21) Appl. No.: 12/422,354

(22) Filed: Apr. 13, 2009

(65) Prior Publication Data

US 2010/0259115 A1   Oct. 14, 2010

(51) Int. Cl.
*H02K 7/04* (2006.01)
*H02K 7/09* (2006.01)
*H02K 5/24* (2006.01)
*H02K 21/12* (2006.01)

(52) U.S. Cl. ................ 310/51; 310/67 R; 310/190
(58) Field of Classification Search ............... 310/51, 310/67 R, 190, 191
See application file for complete search history.

(56) References Cited

U.S. PATENT DOCUMENTS

| | | | | |
|---|---|---|---|---|
| 3,514,648 A | * | 5/1970 | Takao et al. ........... | 310/67 R |
| 6,097,120 A | * | 8/2000 | Horng .................... | 310/90.5 |
| 6,249,505 B1 | | 6/2001 | Miyamoto et al. | |
| 6,414,411 B1 | * | 7/2002 | Horng et al. ........... | 310/194 |
| 6,727,626 B2 | * | 4/2004 | Horng et al. ........... | 310/190 |
| 7,265,464 B2 | * | 9/2007 | Chen ..................... | 310/68 B |
| 7,501,736 B2 | | 3/2009 | Nakajima et al. | |
| 2005/0006962 A1 | * | 1/2005 | Horng .................... | 310/51 |

FOREIGN PATENT DOCUMENTS

JP   2005192265 A * 7/2005
TW       423760    2/2001

* cited by examiner

*Primary Examiner*—Tran N Nguyen
(74) *Attorney, Agent, or Firm*—Alan Kamrath; Kamrath & Associates PA

(57) ABSTRACT

A motor includes a base, a stator mounted to the base, a rotor rotatably coupled to the base, and a balancing member. The rotor includes a permanent magnet having a first magnetically conductive face with a first width in a radial direction. The balancing member includes an upper surface facing the permanent magnet. A magnetically conductive section is formed between the upper surface and the first magnetically conductive face. The balancing member further includes a magnetically attracting portion in the magnetically conductive section. The magnetically attracting portion includes a second magnetically conductive face having a second width in the radial direction. The second width is not greater than the first width. A magnetically attracting spacing is formed between the first and second magnetically conductive faces and in a range of 0.2-1.5 mm.

9 Claims, 8 Drawing Sheets

MOTOR HAVING ROTATION BALANCING MEMBER

BACKGROUND OF THE INVENTION

1. Field of the Invention

The present invention relates to a motor and, more particularly, to a motor including a balancing member for stabilizing rotation of a rotor of the motor.

2. Description of the Related Art

Motors with a balancing member have been proposed, and an example is disclosed in Taiwan Patent Publication No. 423760 entitled "Brushless D.C. Motor". As shown in FIG. 1, such a motor 9 includes a base 91, a stator 92, a rotor 93, and a balancing plate 94. The base 91 includes an axle tube 911 around which the stator 92 is fixed. The rotor 93 includes a shaft 931 rotatably extending through the axle tube 911 and a permanent magnet 932. The balancing plate 94 is mounted to the base 91, with a magnetically attracting spacing D formed between the balancing plate 94 and the permanent magnet 932 to provide a magnetically attracting effect therebetween, so that the rotor 93 can rotate stably.

The magnetically attracting spacing D is one of the main factors affecting the stable rotation of the rotor 93. Specifically, if the magnetically attracting spacing D is too large, the magnetically attracting effect between the balancing plate 94 and the permanent magnet 932 could be too small, such that the rotor 93 could not rotate stably, leading to wobbling of the rotor 93 and noise and shortening the service life of the motor 9. On the other hand, if the magnetically attracting spacing D is too small, the magnetically attracting effect between the balancing plate 94 and the permanent magnet 932 could be too large, such that rotation of the rotor 93 could be adversely affected. Furthermore, operations of the permanent magnet 932 and the balancing plate 94 could interfere with each other, adversely affecting operational performance of the motor 9.

Thus, a need exits for a motor having an optimal spacing between the balancing plate and the permanent magnet to avoid problems encountered in the conventional motors and to assure stable rotation of the rotor.

SUMMARY OF THE INVENTION

The primary objective of the present invention is to provide a motor including a balancing member that has an optimal magnetically attracting spacing to the permanent magnet to assure stable rotation of a rotor of the motor.

A motor according to the preferred teachings of the present invention includes a base having an axle tube extending along an axis. A stator is mounted around the axle tube. A rotor includes a hub, a shaft coupled to the hub, and a permanent magnet coupled to the hub. The shaft is rotatably extended through the axle tube, with an air gap formed between the permanent magnet and the stator. The first permanent magnet includes a first magnetically conductive face having a first width in a radial direction perpendicular to the axis. A balancing member is mounted below the rotor and includes an upper surface facing the permanent magnet. A magnetically conductive section is formed between the upper surface and the first magnetically conductive face. The balancing member further includes a magnetically attracting portion in the magnetically conductive section. The magnetically attracting portion includes a second magnetically conductive face having a second width in the radial direction. The second width is not greater than the first width. A magnetically attracting spacing is formed between the first and second magnetically conductive faces and in a range of 0.2-1.5 mm.

Preferably, the second magnetically conductive face of the balancing member is between the first magnetically conductive face of the permanent magnet and the upper face of the balancing member other than the magnetically attracting portion.

In a preferred form, the balancing member includes a disc having a through-hole through which the axle tube extends.

In another preferred form, the balancing member includes an annular ring having a through-hole through which the axle tube extends.

In a further preferred form, the balancing member includes a plurality of arcuate sections surrounding the axle tube, and the arcuate sections are interconnected to each other.

The second magnetically conductive face can be planar or arcuate.

The second width of the second magnetically conductive face can be not smaller than a half or two-thirds of the first width of the permanent magnet.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

Figure 1:
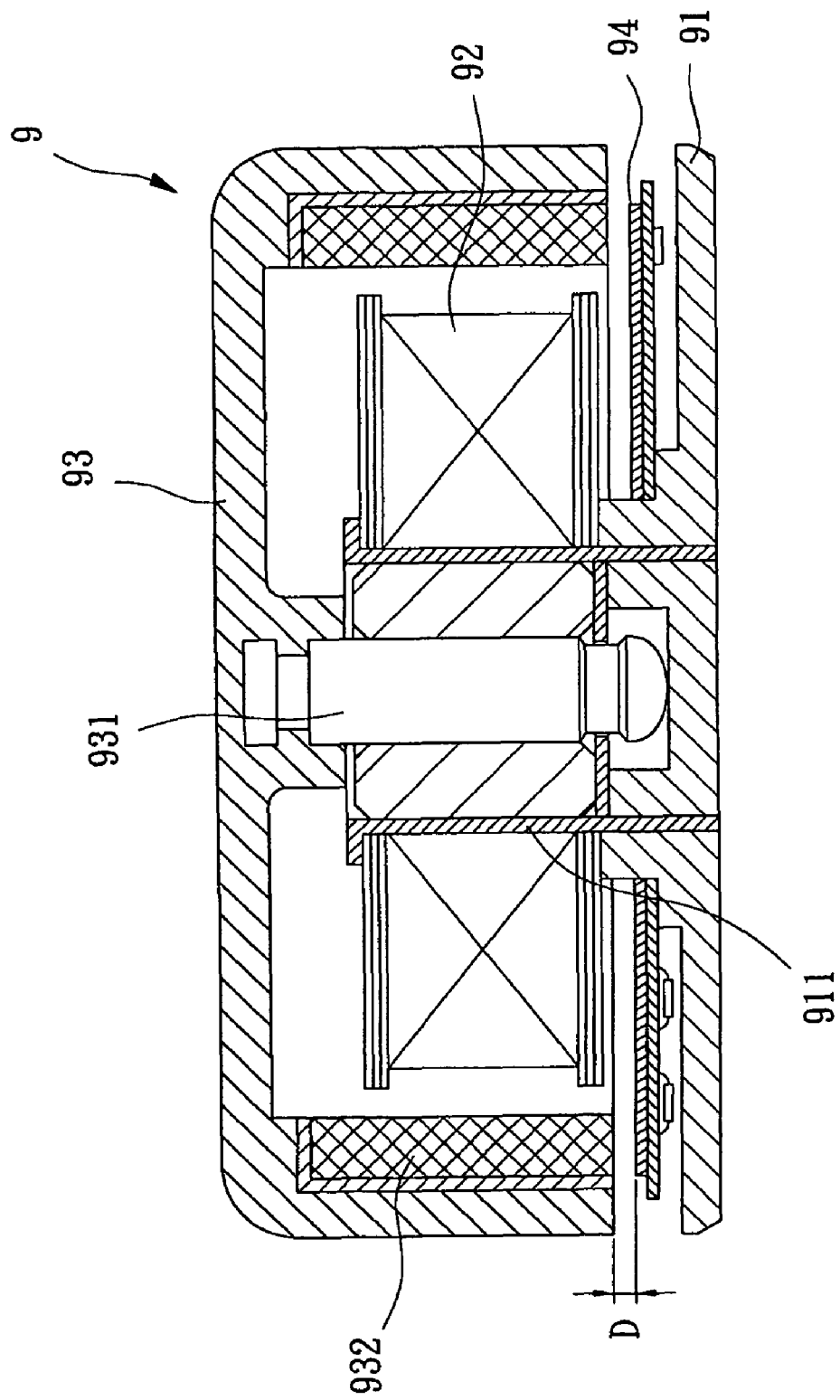
FIG. 1 shows a cross sectional view of a conventional motor having a balancing plate.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "upper", "inner", "outer", "end", "portion", "section", "axial", "radial", "annular", "spacing", "width", and similar terms are used herein, it should be understood that these terms have reference only to the structure shown in the drawings as it would appear to a person viewing the drawings and are utilized only to facilitate describing the invention.

DETAILED DESCRIPTION OF THE INVENTION

Figure 2:
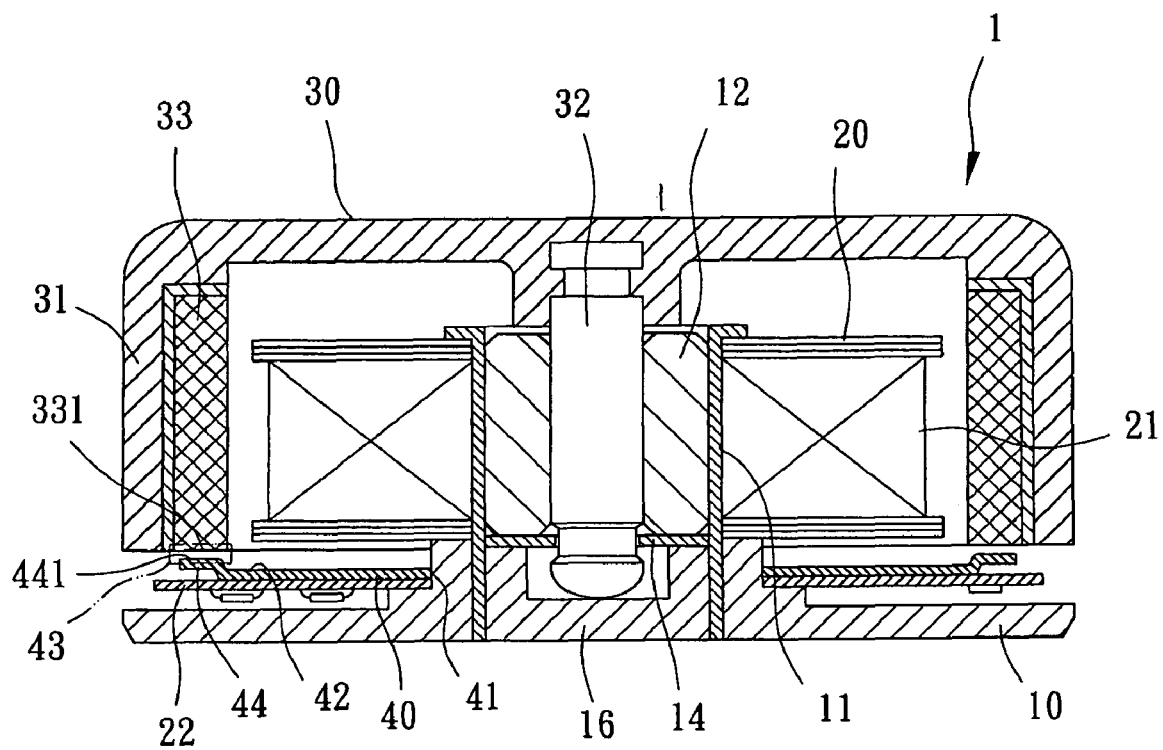
FIG. 2 shows a cross sectional view of a motor of a first embodiment according to the preferred teachings of the present invention.
Figure 3:
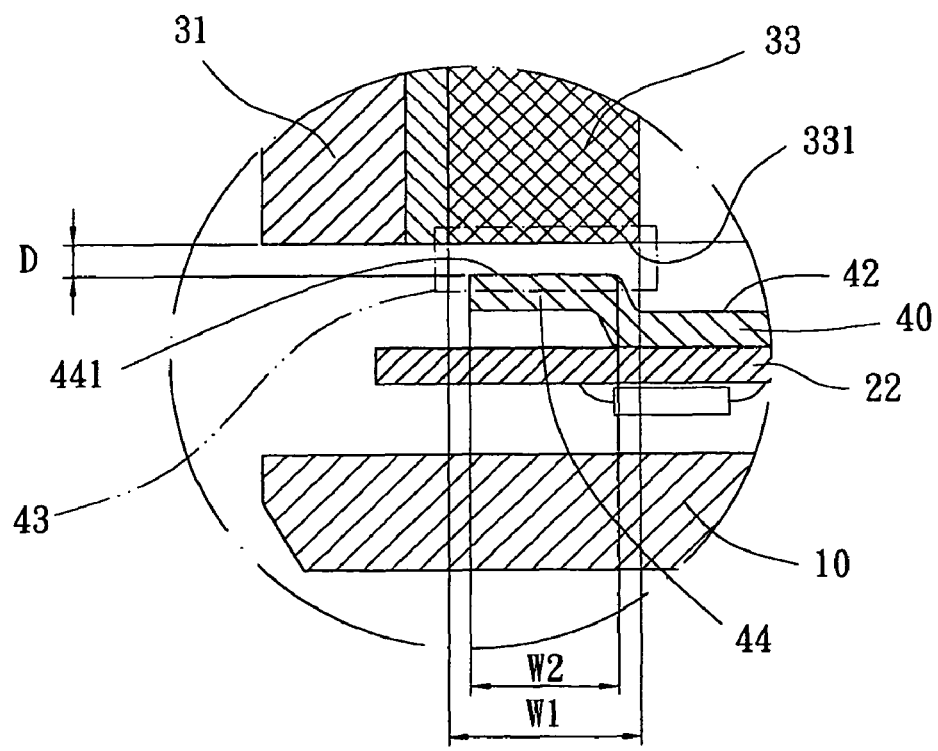
FIG. 3 shows an enlarged view of a portion of the motor of FIG. 2.
Figure 4:
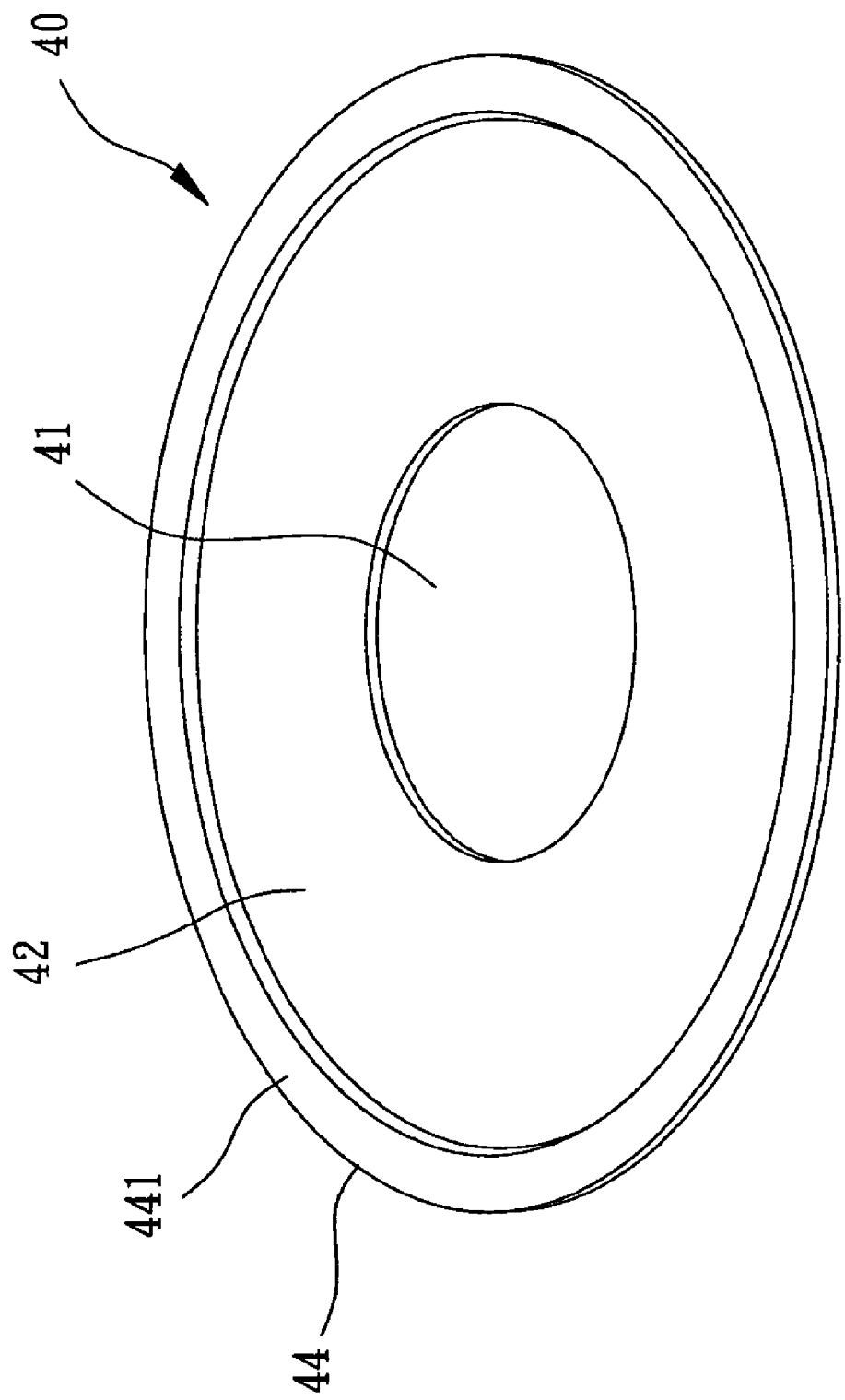
FIG. 4 shows a perspective view of a balancing member of the motor of FIG. 2.

A motor 1 of a first embodiment according to the preferred teachings of the present invention is shown in FIGS. 2-4 of the drawings. According to the preferred form shown, the motor 1 includes a base 10, a stator 20, a rotor 30, and a balancing member 40.

According to the preferred form shown, the base 10 includes an axle tube 11 extending along an axis and receiving a bearing 12, a retainer ring 14, and an end cap 16. The base 10 can be in the form of a housing for a fan.

The stator 20 is mounted around an outer periphery of the axle tube 11 and includes a winding 21 and a circuit board 22 electrically connected to the winding 21. The winding 21 can be a radial winding or an axial winding.

The rotor 30 includes a hub 31, a shaft 32, and a permanent magnet 33. The hub 31 can include a plurality of blades on an outer periphery thereof, so that the rotor 30 can be utilized as an impeller of a fan. The shaft 32 is rotatably extended through the axle tube 11 of the base 10 and rotatable about the axis of the axle tube 11. In the most preferred form shown, the shaft 32 is extended through the bearing 12 and has a distal end abutting the end cap 16, with the retainer ring 14 sandwiched between the bearing 12 and the end cap 16 and engaged in a necked portion of the shaft 32. The permanent magnet 33 is in the shape of a ring and mounted to an inner periphery of the hub 31, with an air gap formed between the permanent magnet 33 and the stator 20. The air gap can be a radial gap or an axial gap to match with the structure of the motor 1. The permanent magnet 33 includes a first magnetically conductive face 331 having a first width W1 in a radial direction perpendicular to the axis of the axle tube 11. The first width W1 is one of the main factors affecting the magnetically attracting force between the first magnetically conductive face 331 and the balancing member 40.

In the preferred form shown in FIGS. 2-4, the balancing member 40 is made of magnetically conductive material and mounted below the rotor 30 or between the rotor 30 and the base 10. Furthermore, the balancing member 40 can be mounted to the base 10 or the stator 20 according to need. The balancing member 40 is in the form of a disc having a through-hole 41 through which the axle tube 11 extends. Thus, the balancing member 40 is directly mounted on top of the circuit board 22 of the stator 20. The balancing member 40 further includes an upper surface 42 facing the permanent magnet 33, with a magnetically conductive section 43 formed between the upper surface 42 and the first magnetically conductive face 331.

The balancing member 40 further includes a magnetically attracting portion 44 in the magnetically conductive section 43. The magnetically attracting portion 44 includes a second magnetically conductive face 441 between the upper surface 42 of the balancing member 40 other than the magnetically attracting portion 44 and the first magnetically conductive face 331 along the axis. Furthermore, the second magnetically conductive face 441 has a second width W2 in the radial direction. The second width W2 is one of the main factors affecting the magnetic attraction between the second magnetically conductive face 441 and the permanent magnet 33. Further, the second width W2 is not greater than the first width W1 and preferably not smaller than a half or two-thirds of the first width W1. Thus, an optimal magnetically attracting spacing D in a range between 0.2-1.5 mm is formed between the second magnetically conductive face 441 of the magnetically attracting portion 44 and the first magnetically conductive face 331 of the permanent magnet 33.

In practical use of the motor 1 according to the teachings of the present invention, due to the air gap between the permanent magnet 33 and the stator 20 and due to the magnetic energization between the winding 21 and the permanent magnet 33 through control of the circuit board 22 of the stator 20, the rotor 30 is driven to rotate. During rotation of the rotor 30, the magnetically attracting spacing D between the permanent magnet 33 and the balancing member 40 provides a magnetically attracting effect to provide the rotor 30 with balancing and positioning effect. Thus, the rotor 30 can rotate stably.

In the motor 1 according to the teachings of the present invention, the magnetically attracting spacing D is decided by the relationship between the magnetically attracting area of the first magnetically conductive face 331 of the permanent magnet 33 and the magnetically attracting area of the second magnetically conductive face 441 of the balancing member 40 and by the structure of the balancing member 40. Overall, to obtain the optimal magnetically attracting spacing D for assuring operational quality of the motor 1, a balance must be reached between the magnetically attracting areas and the spacing between the first and second magnetically conductive faces 331 and 441 on the premise that a predetermined magnetically attracting effect is obtained between the permanent magnet 33 and the balancing member 40.

By providing the second width W2 not greater than the first width W1, the optimal magnetically attracting spacing D is defined between the first and second magnetically conductive faces 331 and 441. Specifically, since the second width W2 is not greater than the first width W1, the second magnetically conductive face 441 can be selected to have a magnetically attracting area smaller than the first magnetically conductive face 331, so that the magnetically attracting spacing D between the first and second magnetically conductive faces 331 and 441 can be adjusted to be in the range of 0.2-1.5 mm. Thus, the problems of wobbling and noise resulting from unbalancing rotation of the rotor 30 due to large spacing is avoided by the motor 1 according to the teachings of the present invention. On the other hand, the problems of low operational efficiency and the interference between the magnetically attracting portion 44 of the balancing member 40 due to small spacing is avoided by the motor 1 according to the teachings of the present invention. Thus, the motor 1 according to the teachings of the present invention possesses better operational quality by providing the balancing member 40 to define an optimal magnetically attracting spacing D between the balancing member 40 and the permanent magnet 33.

Figure 5:
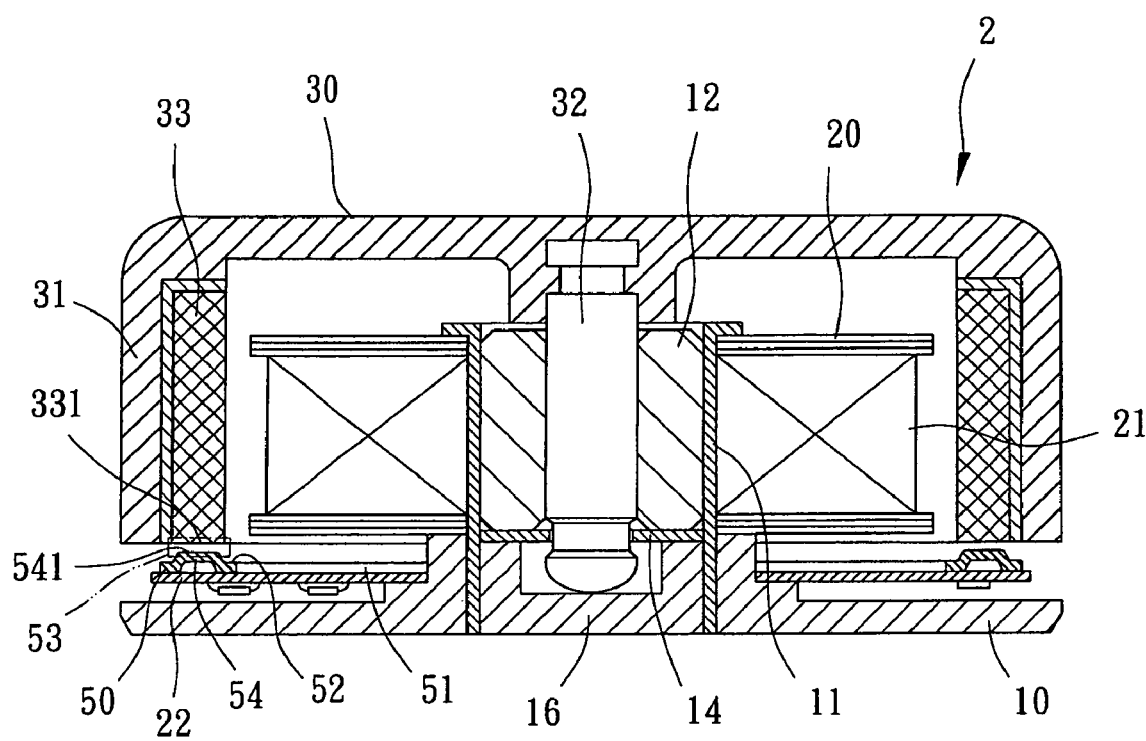
FIG. 5 shows a cross sectional view of a motor of a second embodiment according to the preferred teachings of the present invention.
Figure 6:
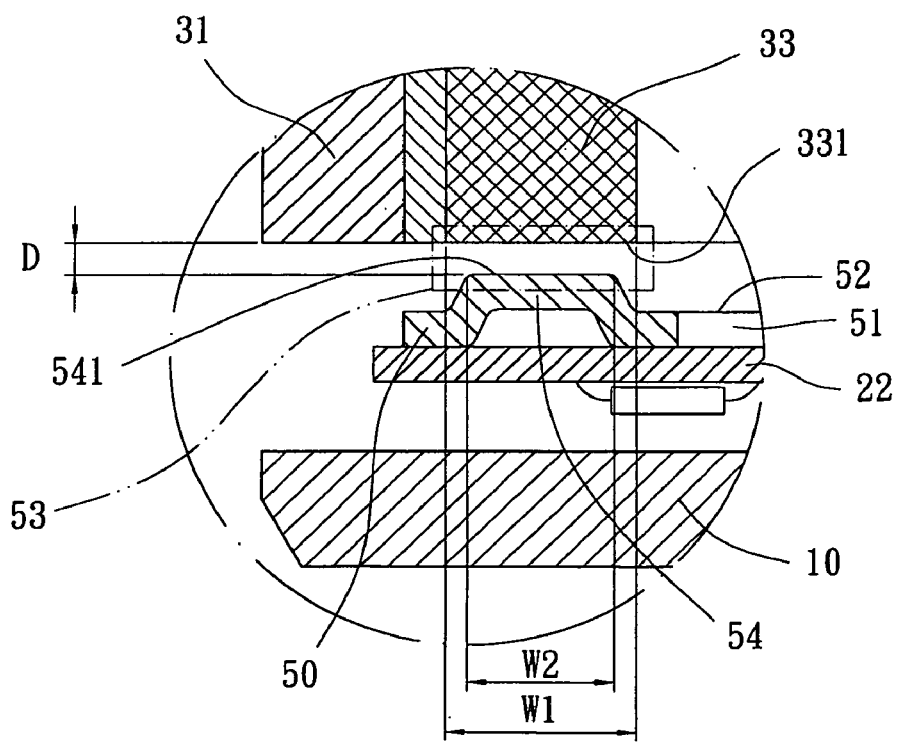
FIG. 6 shows an enlarged view of a portion of the motor of FIG. 5.
Figure 7:
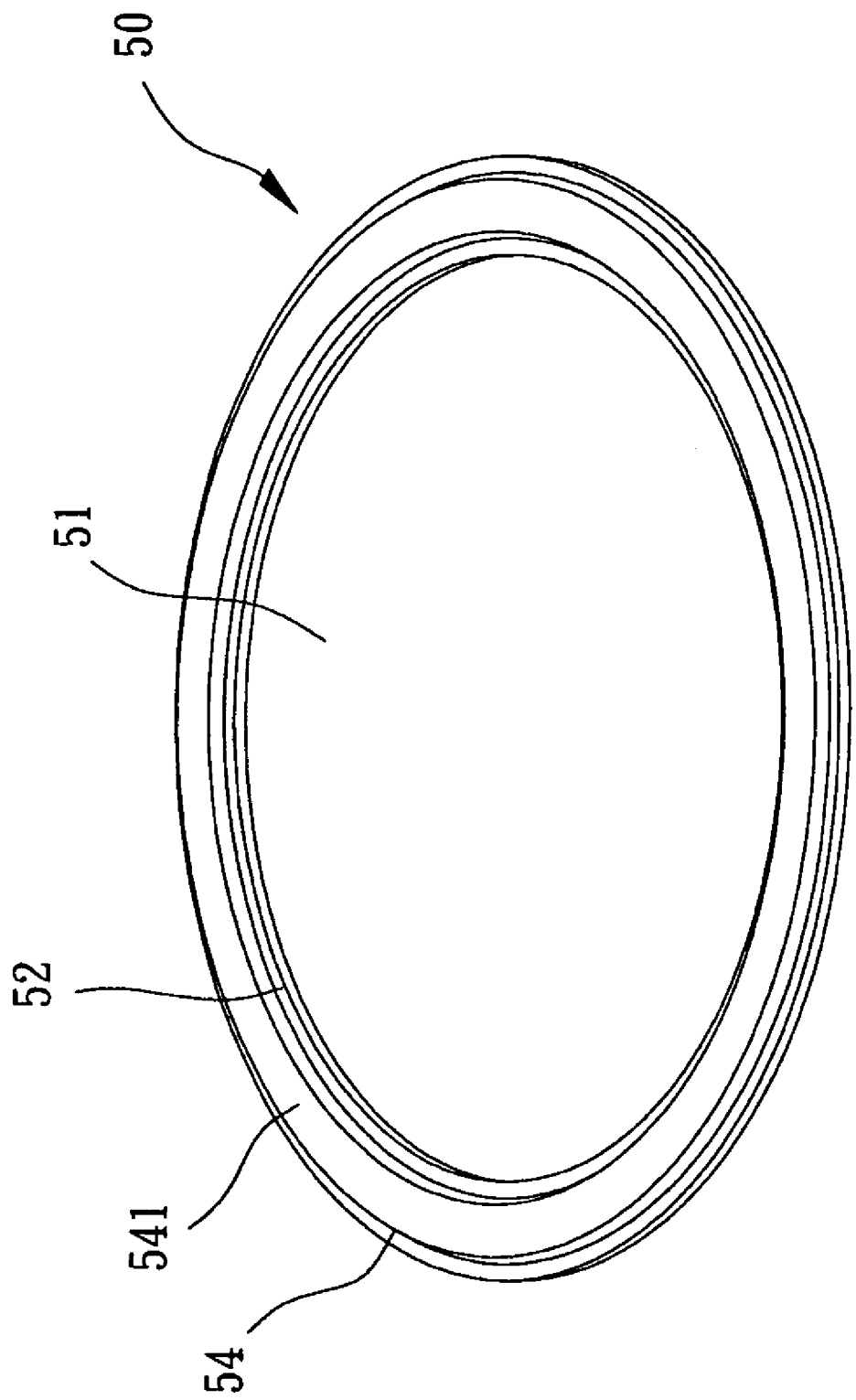
FIG. 7 shows a perspective view of a balancing member of the motor of FIG. 5.

FIGS. 5-7 show a motor 2 of a second embodiment according to the preferred teachings of the present invention. Specifically, the motor 2 includes a base 10, a stator 20, a rotor 30, and a balancing member 50. The base 10, the stator 20, and the rotor 30 are substantially the same as those of the motor 1 of the first embodiment.

In the second embodiment, the balancing member 50 is mounted between the rotor 30 and the base 10. The balancing member 50 includes an upper surface 52, a magnetically conductive section 53, a magnetically attracting portion 54, and a second magnetically conductive face 541, which are substantially the same as the upper surface 42, the magnetically conductive section 43, the magnetically attracting portion 44, and the second magnetically conductive face 441 of the balancing member 40 of the first embodiment. The second magnetically conductive face 541 has a second width W2 not greater than the first width W1, so that an optimal magnetically attracting spacing D can be defined between the first and second magnetically conductive faces 331 and 541. The difference between the balancing member 50 and the balancing member 40 is that the balancing member 50 is an annular ring coupled to the circuit board 22 of the stator 20 to reduce the material cost of the balancing member 50. The balancing member 50 also includes a through-hole 51 through which the axle tube 11 of the base 10 extends.

Figure 8:
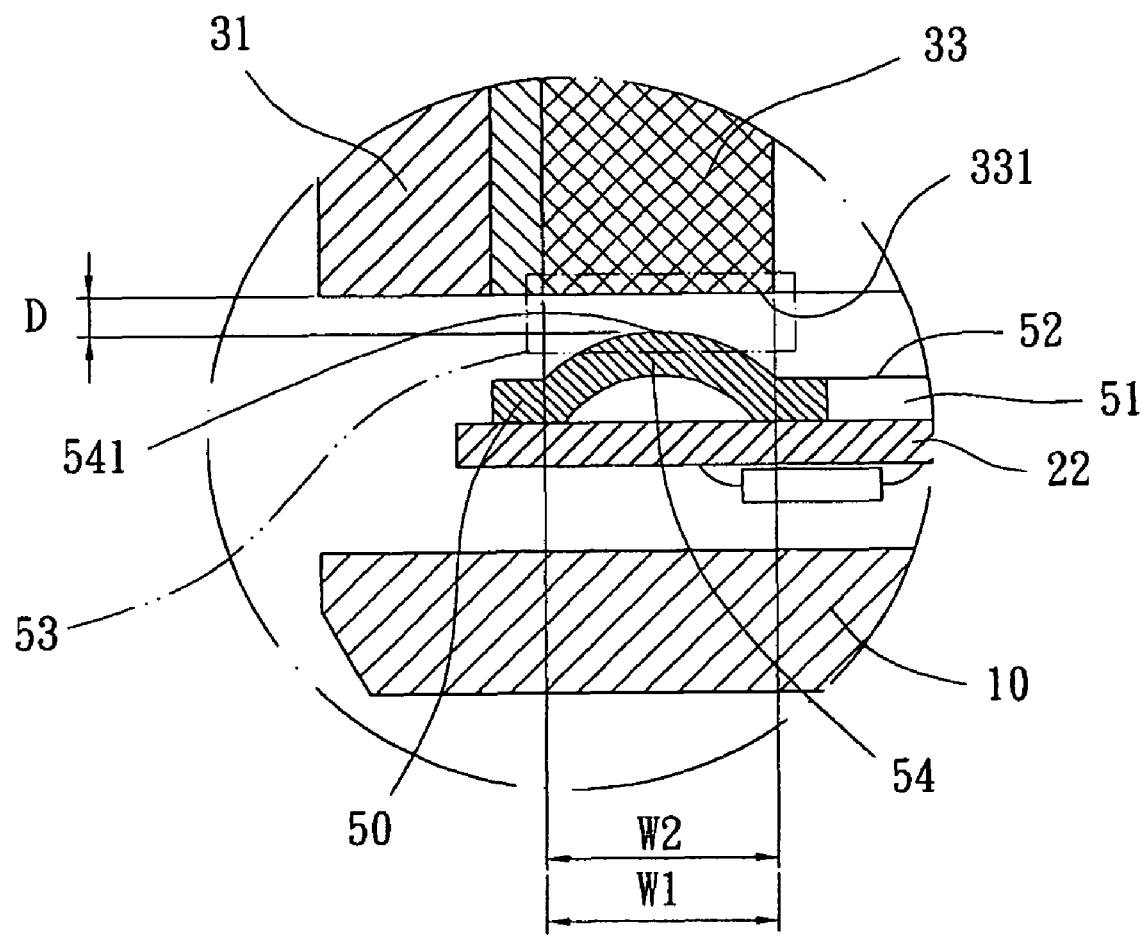
FIG. 8 shows a cross sectional view of a modified embodiment of the balancing member of FIG. 7.

Furthermore, the second magnetically conductive face 541 can be planar, so that the second magnetically conductive face 541 provides a magnetically attracting area larger than that of the first embodiment. Thus, the magnetically attracting spacing D between the planar second magnetically conductive face 541 and the first magnetically conductive face 331 is in the range of 0.2-1.5 mm. In a modified embodiment shown in FIG. 8, the second magnetically conductive face 541 is arcuate. When the magnetically attracting spacing D is in the range of 0.2-1.5 mm, the spacing between a top edge of the arcuate second magnetically conductive face 541 and the first magnetically conductive face 331 can be set as 0.2 mm, whereas the spacing between each of two sides of the second magnetically conductive face 541 and the first magnetically conductive face 331 can be set as 1.5 mm. Thus, due to the second magnetically conductive face 541 with an arcuate face providing level difference, an optimal magnetically attracting spacing D is obtained even if the second width W2 of the second magnetically conductive face 541 is equal to the first width W1 of the first magnetically conductive face 331. Accordingly, the rotor 30 can rotate stably while providing better operational efficiency.

Figure 9:
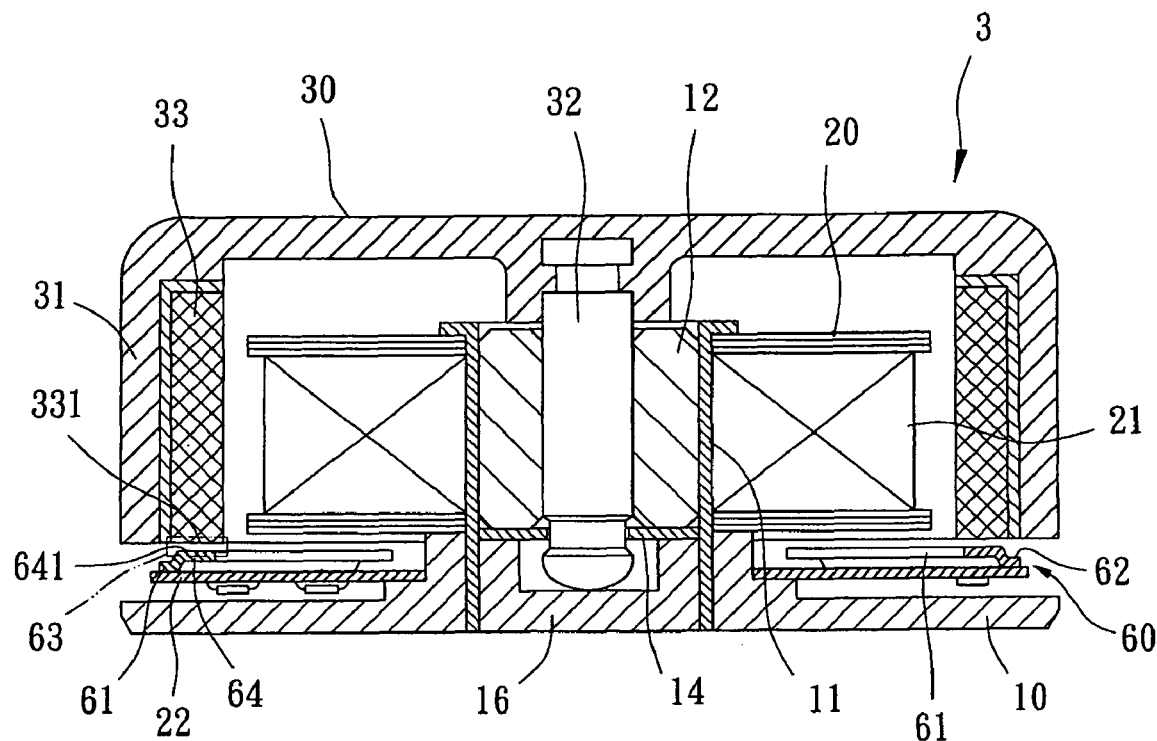
FIG. 9 shows a cross sectional view of a motor of a third embodiment according to the preferred teachings of the present invention.
Figure 10:
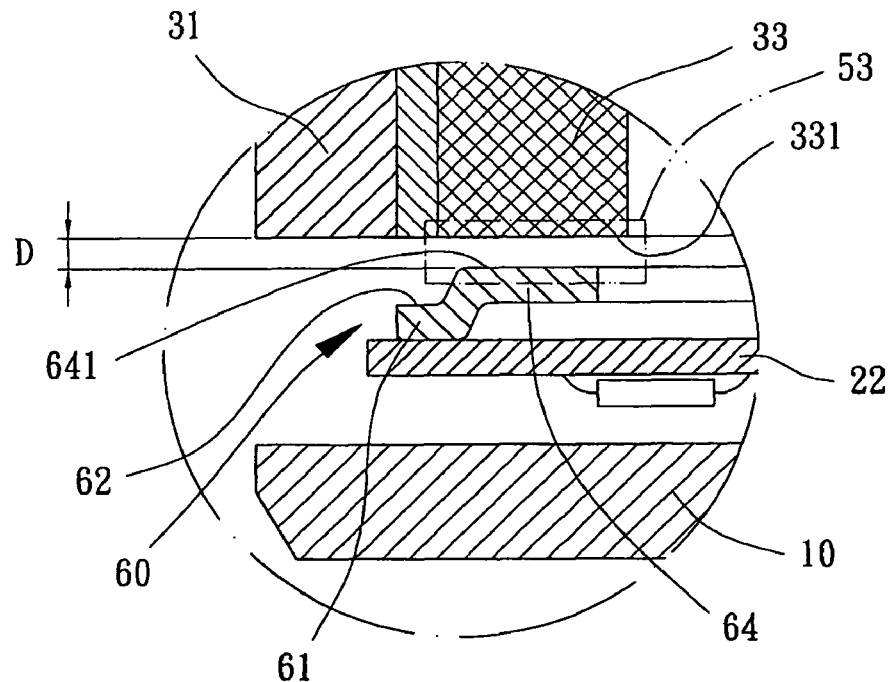
FIG. 10 shows an enlarged view of a portion of the motor of FIG. 9.
Figure 11:
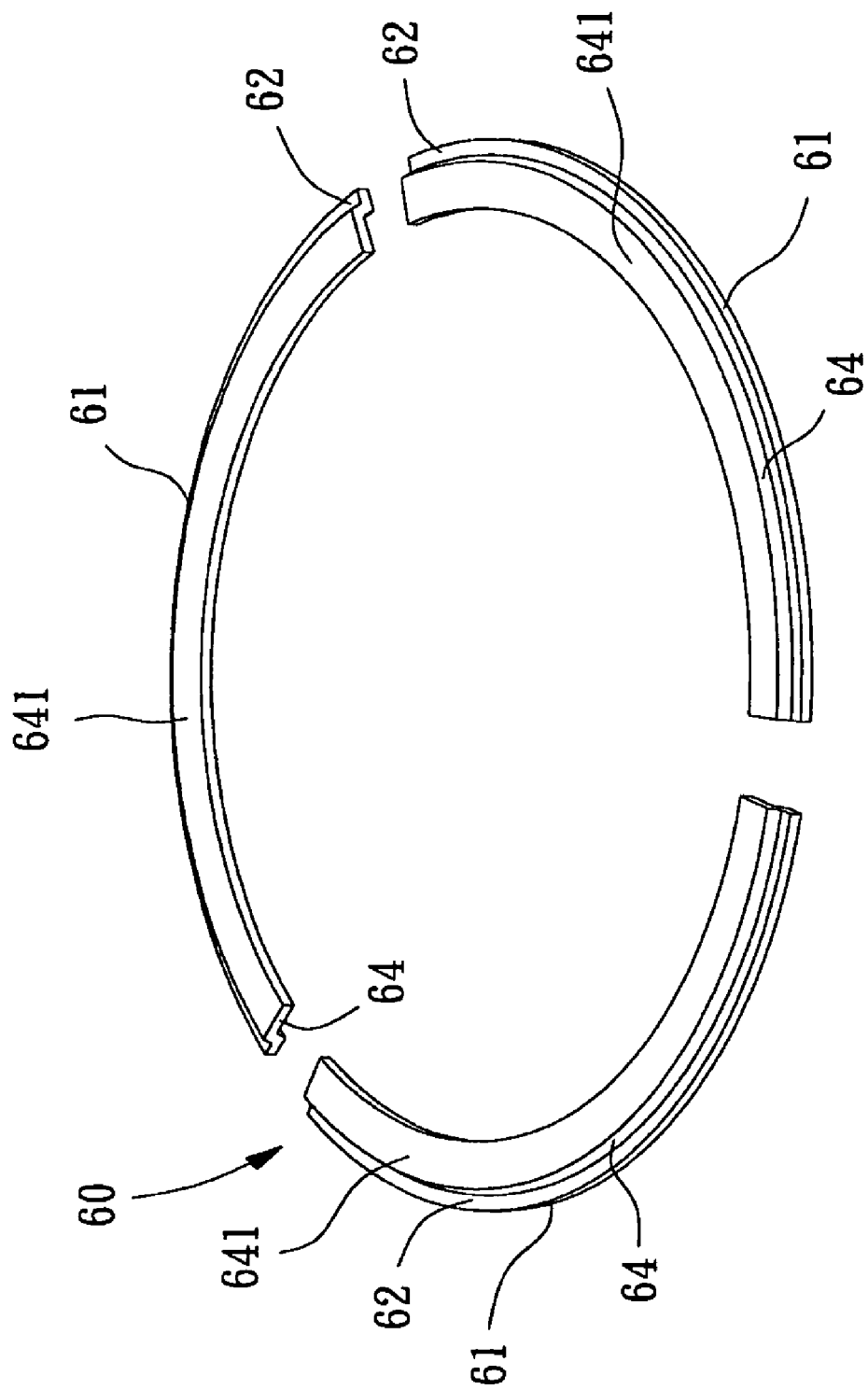
FIG. 11 shows a perspective view of a balancing member of the motor of FIG. 9.

FIGS. 9-11 show a motor 3 of a third embodiment according to the preferred teachings of the present invention. Specifically, the motor 3 includes a base 10, a stator 20, a rotor 30, and a balancing member 60. The base 10, the stator 20, and the rotor 30 are substantially the same as those of the motors 1 and 2 of the first and second embodiments.

In the third embodiment, the balancing member 60 is mounted between the rotor 30 and the base 10. The balancing member 60 includes a plurality of arcuate sections 61 those are identical in structure and can be assembled together around the axle tube 11. Thus, the arcuate sections 61 can be mounted around the axle tube 11 and form a ring. Each arcuate section 61 includes an upper surface 62 facing the permanent magnet 33, with a magnetically conductive section 63 formed between the first magnetically conductive face 331 of the permanent magnet 33 and the upper face 62. Each arcuate section 61 further includes a magnetically attracting portion 64 formed in the magnetically conductive section 63 and having a second magnetically conductive face 641 between the upper surface 62 of the balancing member 60 other than the magnetically attracting portion 64 and the first magnetically conductive face 331 along the axis. The second magnetically conductive face 641 has a second width W2 in the radial direction of the balancing member 60 not greater than the first width W1 of the first magnetically conductive face 331. By such an arrangement, a magnetically attracting spacing D in a range of 0.2-1.5 mm is formed between the second magnetically conductive face 641 of the magnetic attracting portion 64 of the balancing member 60 and the first magnetically conductive face 331 of the permanent magnet 33. Furthermore, by arranging the arcuate sections 61 surrounding the axle tube 11 of the base 10, the balancing member 60 does not have to be extended through by the axle tube 11 during assembly, allowing assembling tolerance.

Due to the provision of the balancing member 40, 50, 60 including a magnetic attracting portion 44, 54, 64 with a second width W2 not greater than the first width W1 of the permanent magnet 33, an optimal magnetically attracting spacing D in the range of 0.2-1.5 mm can be formed between the permanent magnet 33 and the balancing member 40, 50, 60. Accordingly, the rotor 30 of the motor 1, 2, 3 according to the teachings of the present invention can rotate stably and provide enhanced operational efficiency.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A motor comprising:
a base including an axle tube extending along an axis;
a stator mounted around the axle tube;
a rotor including a hub, a shaft coupled to the hub, and a permanent magnet coupled to the hub, with the shaft rotatably extending through the axle tube, with an air gap formed between the permanent magnet and the stator, with the permanent magnet including a first magnetically conductive face having a first width in a radial direction perpendicular to the axis; and
a balancing member mounted below the rotor, with the balancing member including an upper surface facing the permanent magnet, with a magnetically conductive section formed between the upper surface and the first magnetically conductive face, with the balancing member further including a magnetically attracting portion in the magnetically conductive section, with the magnetically attracting portion including a second magnetically conductive face having a second width in the radial direction, with the second width not greater than the first width, and with a magnetically attracting spacing being formed between the first and second magnetically conductive faces and in a range of 0.2-1.5 mm.

2. The motor as claimed in claim 1, with the second magnetically conductive face of the balancing member axially between the first magnetically conductive face of the permanent magnet and the upper face of the balancing member other than the magnetically attracting portion.

3. The motor as claimed in claim 1, with the balancing member being a disc having a through-hole through which the axle tube extends.

4. The motor as claimed in claim 1, with the balancing member including an annular ring having a through-hole through which the axle tube extends.

5. The motor as claimed in claim 1, with the balancing member including a plurality of arcuate sections surrounding the axle tube, with the plurality of arcuate sections being interconnected to each other.

6. The motor as claimed in claim 1, with the second magnetically conductive face being planar.

7. The motor as claimed in claim 1, with the second magnetically conductive face being arcuate.

8. The motor as claimed in claim 1, with the second width of the second magnetically conductive face being not smaller than a half of the first width of the permanent magnet.

9. The motor as claimed in claim 1, with the second width of the second magnetically conductive face being not smaller than two-thirds of the first width of the permanent magnet.

* * * * *